United States Patent [19]

Pope et al.

[11] Patent Number: 5,364,568
[45] Date of Patent: Nov. 15, 1994

[54] COMPOUNDS AND METHODS FOR SEPARATION AND MOLECULAR ENCAPSULATION OF METAL IONS

[75] Inventors: Michael T. Pope, Washington, D.C.; Inge I. Creaser, Scott Creek, Australia; Mark C. Heckel, East Hampton, Mass.

[73] Assignee: Georgetown University, Washington, D.C.

[21] Appl. No.: 910,532

[22] Filed: Jul. 8, 1992

[51] Int. Cl.5 .............................................. G21F 9/16
[52] U.S. Cl. ..................................... 588/18; 423/306; 423/314; 423/326; 423/601; 423/606; 423/617; 423/635; 423/641
[58] Field of Search .................. 423/6, 21.5, 326, 601, 423/606, 617, 635, 641, 305, 306, 314; 252/628, 629

[56] References Cited

U.S. PATENT DOCUMENTS

| | | | |
|---|---|---|---|
| 4,634,502 | 1/1987 | Callahan et al. | 204/23 |
| 4,839,008 | 6/1989 | Hill | 204/157.15 |
| 4,864,041 | 9/1989 | Hill | 549/513 |
| 5,093,134 | 3/1992 | Murrer et al. | 424/617 |
| 5,114,691 | 5/1992 | Pinnavaia et al. | 423/244 |
| 5,210,307 | 5/1993 | Bowman et al. | 564/479 |
| 5,239,105 | 8/1993 | Pews et al. | 558/274 |

OTHER PUBLICATIONS

Chemical Abstracts, vol. 50, p. 16503, E. A. Nikitina, et al., "The Structure Of The Inner Sphere Of Heteropoly Acids".
Chemical Abstracts, vol. 49, 1955, p. 8724, E. A. Nikitina, et al., "The Reductin Of Silicotungstates With Hydrogen. II. The Reduction Of Cis-Silicotungstic Acid And Its Potassium Salts".
Inorganic Chemistry, vol. 46, 1952, p. 10033, E. A. Nikitina, et al., "Reduction Of Silicotungstates With Hydrogen. II. Reduction Of Unsaturated Potassium Silicotungstates".
Inorganic Chemistry, vol. 46, 1952, pp. 3441-3442, E. A. Nikitina, et al., "Reduction Of Silicotungstates With Hydrogen. IV. Sodium Bronze And Reduction Of Sodium Silicotungstate".
Inorganic Chemistry, vol. 45, 1951, p. 1894, E. A. Nikitina, et al., "Reductin Of Silicotungstates With Hydrogen. I. Potasium Tungsten Bronze".
Acta Chemica Scandinavica, vol. 9, No. 8, 1955, pp. 1241-1251, J. Rydberg, et al., "Combination Of Unit Processes For Isolating Plutonium".
J. Inorg. Nucl. Chem., vol. 43, No. 11, 1981, pp. 2847-2853, G. Blasse, et al., "The Luminescence Of Some Lanthanide Decatungstates And Other Polytungstates".

(List continued on next page.)

Primary Examiner—Donald P. Walsh
Assistant Examiner—Ngoclan T. Mai
Attorney, Agent, or Firm—Oblon, Spivak, McClelland, Maier, & Neustadt

[57] ABSTRACT

Anions of the formula (I):

$$[DA_5M_{30-x}O_{110-x}(M'L)_x]^{m-} \quad (I)$$

in which D is $Na^+$, $Ca^{2+}$; A is P, As, Sb, Si, Ge, or combinations thereof M is $W^{5+}$, $W^{6a}$, or mixtures thereof; M' is a metallic element from groups 2 to 15 of the periodic table; other than W; L is $O^{2-}$, $OH^-$, $H_2O$; x is 0-10; and m is 10-20; selectively react with cations $Z^{n+}$ to afford anions of the formula (II):

$$[ZA_5M_{30-x}O_{110-x}(M'L)_x]^{(m+1-n)-} \quad (II)$$

wherein n is 3 or 4; Z=Sm, Eu, Gd, Tb, Dy, Ho, Er, Tm, Yb, Lu, Y, or Bi, when n=3, and Z=Ce, U, Np, Pu, or Am, when n=4. This reaction may be used for the selective encapsultion of lanthanide or actinide cations, and salts containing anions of formula (II) may be vitrified to form glasses or reduced to form tungsten "bronze" materials suitable for the long-germ storage of radioactive lanthanides or actinides.

21 Claims, 6 Drawing Sheets

OTHER PUBLICATIONS

The Journal of Chemical Physics, vol. 41, No. 10, Nov. 15, 1964, pp. 3061–3069, P. K. Gallagher, "Absorption And Fluorescence Of Europium (III) In Aqueous Solutions".

Transition Met. Chem., vol. 3, 1978, pp. 103–108, S. C. Termes, et al., "Stabilization Of Uranium (V) In Heteropoly Anions".

Inorg. Chem., vol. 23, 1984, pp. 3292–3297, F. Ortega, et al., "Polyoxotungstate Anions Containing High-Valent Rhenium. 1. Keggin Anion Derivatives[1]".

Analytical Chemistry, vol. 48, No. 11, Sep. 1976, pp. 1446–1458, C. N. Reilley, et al., "Separation Of Contact And Dipolar Lanthanide Induced Nuclear Magnetic Resonance Shifts: Evaluation And Application Of Some Structure Independent Methods".

Aust. J. Chem., vol. 25, 1972, pp. 2577–2581, R. M. Golding, et al., "A Theoretical Study Of The $^{14}N$ and $^{17}O$ N.M.R. Shifts In Lanthanide Complexes".

Journal of Magnetic Resonance, vol. 8, 1972, pp. 91–100, B. Bleaney, "Nuclear Magnetic Resonance Shifts In Solution Due To Lanthanide Ions".

Polyhedron, vol. 9, No. 10, 1990, pp. 1249–1256, M. A. Fedotov, et al., "$^{17}O, ^{13}P$ and $^{183}W$ NMR Spectra Of Paramagnetic Complexes With The Heteropolytungstate Anion $[Ln(PW_{11}O_{39})_2]^{11-}$ *And Their Constitution In Aqueous Solution. Ln—Rare Earth Element*".

J. Chem. Soc., vol. A, 1971, pp. 1836–1839, R. D. Peacock, et al., "Heteropolytungstate Complexes Of The Lanthanide Elements. Part I. Preparation And Reactions".

Acta Cryst. vol. 32, 1976, pp. 751–767, R. D. Shannon, "Revised Effective Ionic Radii And Systematic Studies Of Interatomic Distances In Halides And Chalcogenides".

Inorganic Chemistry, vol. 23, No. 10, 1984, pp. 1478–1484, R. Acerete, et al., "Reinterpretations, Based On $^{183}W$ NMR Spectra, Of Several Heteropolytungstates Derived From The Wells–Dawson 2:18 Structure. Preparation And Structure Proof For The First γ–Isomer Of A 2:18 Complex[1]".

Inorganic Chemistry, vol. 16, No. 11, 1977, pp. 2916–2926, R. Massart, et al., "$^{31}P$ NMR Studies On Molybdic And Tungstic Heteropolyanions. Correlation Between Structure And Chemical Shift".

J. Am. Chem. Soc., vol. 106, 1984, pp. 2737–2738, D. E. Katsoulis, et al., "New Chemistry For Heteropolyanions In Anhydrous Nonpolar Solvents. Coordinative Unsaturation Of Surface Atom Polyanion Oxygen Carriers".

Inorg. Synth., vol. 27, 1990, pp. 115–118, Y. Jeannin, et al., "The Sodium Pentaphosphato(V)–Triacontatungstate Anion Isolated As The Ammonium Salt".

Bulletin De La Societe Chimique De France, 1970, pp. 30–36, C. Preyssler.

Alizadeh et al, J. Am. Chem. Soc., vol. 107, No. 9, 1985, p. 2662.

G. R. Choppin and J. Rydberg, Nuclear Chemistry–Theory and Applications, Chapter 20, "Treatment of Spent Nuclear Fuel", Pergamon, Oxford (1980).

The Chemistry of the Actinide Elements, Second Edition, vol. 2, Katz, Seaborg, and Morss, eds., pp. 1176–1195, Chapman and Hall, New York (1986).

E (VOLT)

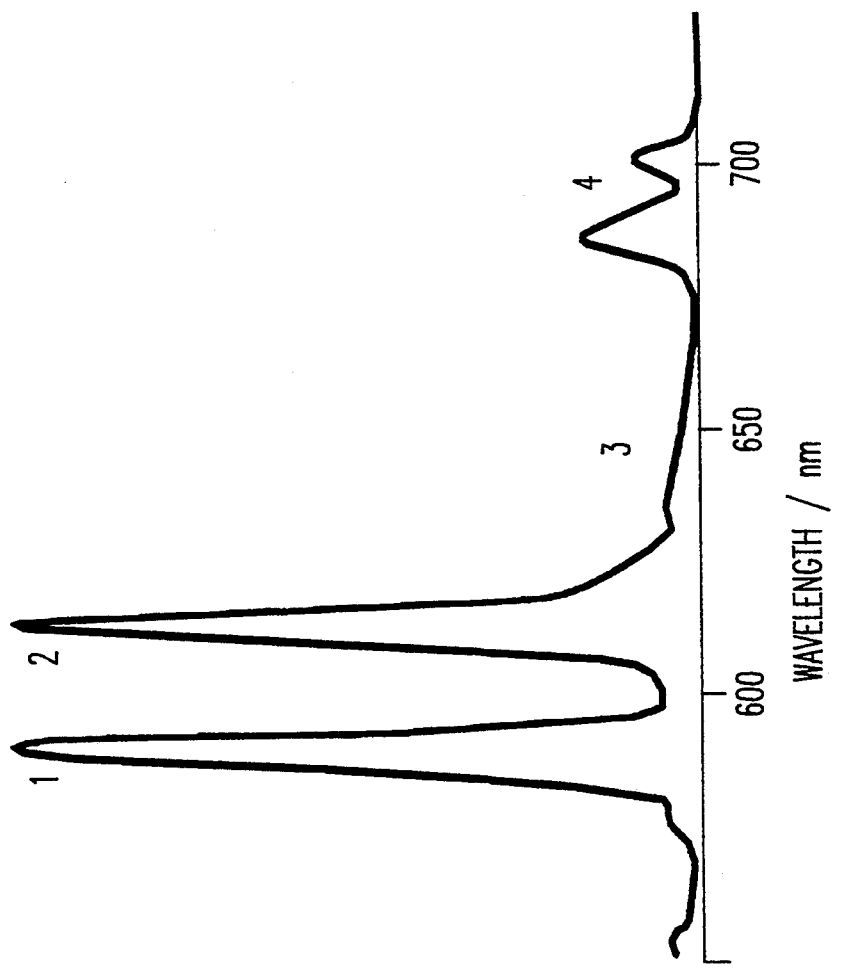

COMPOUNDS AND METHODS FOR SEPARATION AND MOLECULAR ENCAPSULATION OF METAL IONS

BACKGROUND OF THE INVENTION

1. Field of the Invention

The present invention relates to novel compounds which are useful for the separation and encapsulation of metal ions, a method of separating an encapsulating metal ions using such compounds, and metal complexes with such compounds. The present invention also relates to an improved method for reprocessing spent nuclear reactor fuel and an improved method for disposing of radioactive wastes.

2. Discussion of the Background

Nuclear power offers the potential of an abundant and affordable source of energy. However, the safe disposal of radioactive wastes poses a major obstacle for the further development of the nuclear power industry, particularly in the United States. Specifically, the disposal of radioactive lanthanides present in spent radioactive fuels remains a problem (see: G. R. Choppin and J. Rydberg, *Nuclear Chemistry*, Pergamon, Oxford pp. 502–559, 1980, incorporated herein by reference).

Typically, spent fuel rods are first cooled in the reactor for a few weeks and then transferred to a cooling basin. After storage in the cooling basin for 6–12 months, the spent fuel is either transferred to a special storage facility or sent for reprocessing. At the reprocessing plant, the spent fuel is chopped, and then the oxide fuel is extracted by leaching with boiling 6–11 M $HNO_3$. This leaching process results in an aqueous solution which contains radioactive wastes, including lanthanide fission products, which must be removed from the elements which are to be recycled into reactor fuel, uranium and plutonium.

Currently, the separation of plutonium and uranium is achieved by the solvent extraction process in which the spent fuels are dissolved in nitric acid and contacted with an organic solvent to selectively extract the desired elements. Alternatively, the uranium and plutonium may be separated by first forming $UF_6$ and $PuF_6$ in a molten fluoride salt eutectic and then distilling these compounds. In another process, the spent fuel may be dissolved in a salt melt and selectively extracted with another salt melt. Lastly, the metallic fuel elements can be melted or dissolved in a molten metal, such as a zinc alloy, and the strongly electropositive fission products removed as oxides after addition of a deficiency of oxygen, and the volatile fission products removed by distillation.

Currently, storage in stable geological formations such as salt domes is contemplated as the preferred method for long term storage of radioactive wastes from spent fuel. Thus, all of these methods require that the separated fission products be solidified before storage. When the waste is obtained in the form of nitrates it is usually first calcined to convert the metals to oxides. Since such calcines have only a low resistance to leaching, a low heat conductivity, and can be easily disperse in air, they cannot be used as the final storage product. Thus, the emphasis has been on the development of methods for fixing the waste in borosilicate or phosphate glass. However, such methods are costly and time consuming. Further, the great number of steps increases the risk with regard to safety.

Thus, there remains a need for an improved method for reprocessing radioactive wastes and chemical agents to be used in such improved methods. There also remains a need for compounds which are useful for the separation and encapsulation of metal ions. There also remains a need for a method of separating and encapsulating metal ions. There also remains a need for stable complexes of metals, in particular lanthanides, suitable for long-term storage.

SUMMARY OF THE INVENTION

Accordingly, it is one object of the present invention to provide novel compounds for the separation of metal ions.

It is another object of the present invention to provide novel methods for separating metal ions using such compounds.

It is another object of the present invention to provide novel compounds for the encapsulation of metal ions.

It is another object of the present invention to provide novel compounds for the encapsulation of lanthanide metals.

It is another object of the present invention to provide compounds for the encapsulation of actinide metals.

It is another object of the present invention to provide novel methods for encapsulating metal ions using such compounds.

It is another object of the present invention to provide novel methods for the encapsulation of lanthanide metals.

It is another object of the present invention to provide novel methods for the encapsulation of radioactive lanthanide metals.

It is another object of the present invention to provide novel methods for the encapsulation of actinide metals.

It is another object of the present invention to provide novel methods for the encapsulation of radioactive actinide metals.

It is another object of the present invention to provide stable complexes of metals suitable for long-term storage.

It is another object of the present invention to provide stable complexes of lanthanide metals suitable for long-term storage.

It is another object of the present invention to provide stable complexes suitable for the long-term storage of radioactive lanthanide metals.

It is another object of the present invention to provide stable complexes suitable for the long-term storage of actinide metals.

It is another object of the present invention to provide stable complexes suitable for the long-term storage of radioactive actinide metals.

It is another object of the present invention to provide a novel method for reprocessing spent nuclear reactor fuel.

It is another object of the present invention to provide a novel method for disposing of radioactive wastes.

It is another object of the present invention to provide novel glasses suitable for the long-term storage of metals.

It is another object of the present invention to provide novel mixed valence tungsten "bronze" materials suitable for the long-term storage of metals.

These and other objects, which will become apparent during the following detailed description, have been achieved by the inventors' discovery that the polyoxometallate anions of the formula (I):

$$[DA_5M_{30-x}O_{110-x}(M'L)_x]^{m-} \quad (I)$$

in which D is $Na^+$, $Ca^{+2}$ or an ion of similar size; M is $W^{6+}$, $W^{5+}$, or mixtures thereof; M' is any metallic element from groups 2 to 15 of the periodic table; L is $O^{2-}$, $OH^-$, $H_2O$ or another suitable ligand, A is P, As, Sb, Si, Ge, or combinations thereof; x is 0–10; and m is the charge based on the valence states of the atoms, typically 10–20, react selectively with the ions $Z^{n+}$ to afford an anion of formula (II):

$$[ZA_5M_{30-x}O_{110-x}(M'L)_x]^{(m+1-n)-} \quad (II)$$

in which X=Sm, Eu, Gd, Tb, Dy, Ho, Er, Tm, Yb, Lu, Y, or Bi, when n=3, and Z=Ce, U, Np, Pu, or Am, when n=4, and that the compounds of formula II may be vitrified to form glasses which are stable and suitable for long-term storage of the metal Z.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 6 is an emission spectrum of $H_n[EuP_5W_{30}O_{110}]^{(12-n)-}$ in a concentrated aqueous solution. Excitation wavelength 464.7 nm, 303° K. Values of J for the transitions $^5D_o$–$^7F_j$ are give in the figure.

DETAILED DESCRIPTION OF THE PREFERRED EMBODIMENTS

Figure 1:
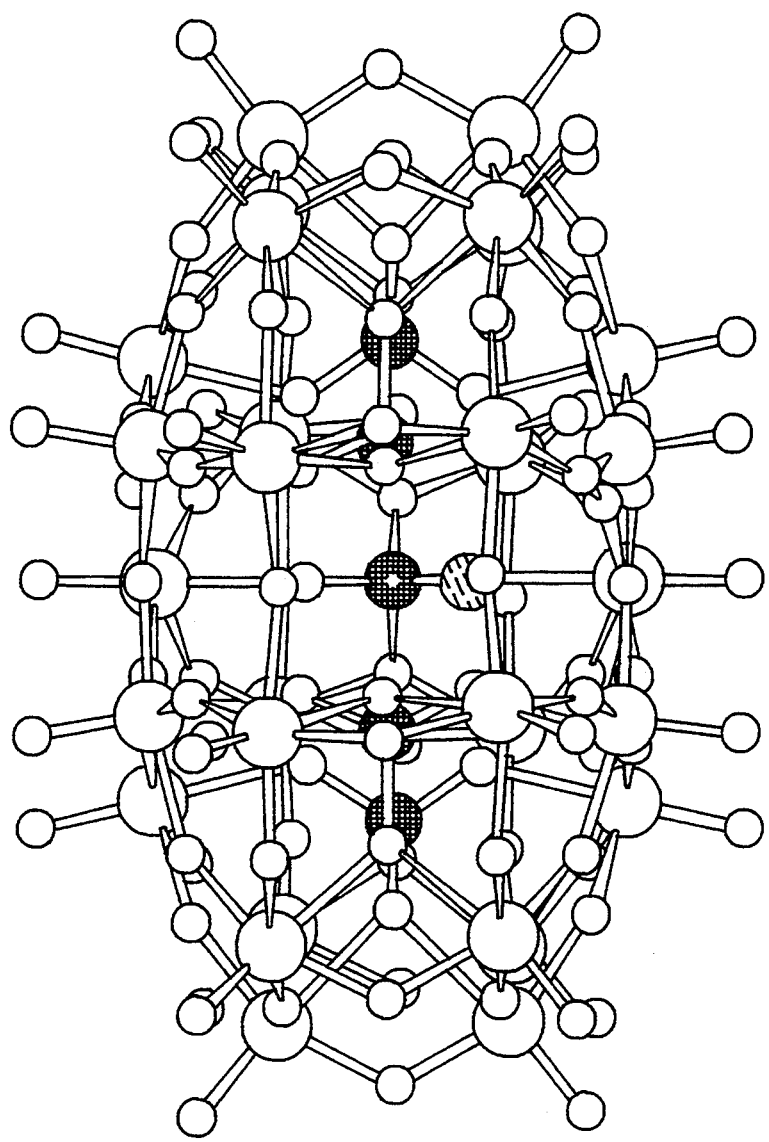
FIG. 1 is a drawing of $[NaP_5W_{30}O_{110}]^{14-}$ viewed perpendicular to the anion's $C_5$ axis. Tungsten and oxygen atoms are represented by large and small circles, respectively, phosphorus atoms by shaded circles, and the sodium atom by a dotted circle.

Thus, in a first embodiment, the present invention relates to a method of selectively isolating a particular metal from a complex reaction mixture by taking advantage of the selective nature of the reaction of an anion of formula (I):

$$[DA_5M_{30-x}O_{110-x}(M'L)_x]^{m-} \quad (I)$$

wherein D is $Na^+$, $Ca^{-2}$ or an ion of similar size; M is $w^{6+}$, $W^{5+}$, or mixtures thereof; M' is any metallic element from groups 2 to 15 of the periodic table; L is $O^{2-}$, $OH^-$, $H_2O$ or another suitable ligand, A is P, As, Sb, Si, Ge, or combinations thereof; x is 0–10; and m is the charge based on the valence states of the atoms, typically 10–20; with $Z^{n+}$ to afford an anion of the formula (II):

$$[ZA_5M_{30-x}O_{110-x}(M'L)_x]^{(m+1-n)-} \quad (II)$$

wherein Z=Sm, Eu, Gd, Tb, dy, Ho, Er, Tm, Yb, Lu, Y, or Bi, when n=3, and Z=Ce, Np, Pu, or Am, when N=4.

In the above-given definition of formula (I), M' may be any metallic element from groups 2 to 15 of the periodic table. For the purposes of the present invention, such groups include the alkaline earth metals, the transition metals, and metals from groups IIIa, IVa, and Va of the main group. Preferred metals for M' include Ti, V, Cr, Mn, Fe, Co, Ni, Cu, Zn, Ga, Ge, Sn, Nb, Ta, Mo, and combinations thereof. Particularly preferred metals for M' include Mo, V, Nb, Ta and combinations thereof.

The choice of L will, in part, depend on the identity of M'. However, the identification and selection of the appropriate choice for L is within the abilities of one having ordinary skill in the art. In addition $O^{2-}$, $OH^-$, and $H_2O$, other suitable ligands include $CN^-$, $NH_3$, $NH_2R$, $NHRR'$, $NRR'R''$ (wherein R, R', and R'' are each independently selected from the group consisting of $C_{1-4}$ alkyl, phenyl, benzyl, and tolyl), CO, pyridine, $C_{1-4}$ alkyl-substituted pyridine, $C_{1-4}$-alkyl, $C_{6-12}$ aryl (including phenyl, biphenyl and naphthyl), $C_{1-4}$ alkyl-substituted $C_{6-12}$ aryl, and $C_{7-20}$ aralkyl (including benzyl).

Suitably, A is an element selected from the group consisting of P, As, Sb, Si, Ge, and combinations thereof It is preferred that A is P, As, or combinations thereof. It is particularly preferred that A is phosphorus.

Preferably, the anion of formula (I) is $[NaP_5W_{29}VO_{110}]^{16-}$ (equal to $[NaP_5W_{29}O_{109}(VO)]^{-16}$) or $[NP_5W_{30}O_{110}]^{14-}$. It is particularly preferred that the anion of formula (I) is $[NaP_5W_{30}O_{110}]^{14-}$.

The metallate anion $[NaP_5W_{30}O_{110}]^{14-}$ is known as the Preyssler anion and will hereinafter sometimes be referred to as $NaP_5W_{30}$. This particular anion may be synthesized as described in Jeanin, Y. et al, *Inorg. Synth.*, 1990, 27, 115; or Preyssler, C., *Bull. Soc. Chim, Fr.*, 1970, 30, both of which are incorporated herein by reference.

The remaining anions of formula (I) may be prepared by a number of methods. In a first method, Preyssler's anion is treated with base by dropwise addition in an aqueous solution to obtain a solution having a pH of 10 to 12, preferably about 12. The addition of alkali is continued, at a rae such that the pH does not exceed 12 until about 12 equivalents of base have been added. Addition of saturated KCl yields a white precipitate which then is added to an aqueous solution containing 1 to 3 equivalents of M'L. The anion of formula (I) may be precipitated by the addition of saturated KCl. This method is exemplified for $K_6Na_{10}[NaP_5W_{29}VO_{110}]\cdot40$-$H_2O$ in Alizadeh, M. H. et al, *J. Am. Chem. Soc.*, 1985, 107, 2662, which is incorporated herein by reference. Other anions of formula (I) may be prepared by substituting various sources of M'L for the $VOSO_4$ used in the above-referenced preparation. Suitable examples of M′L sources include $TiCl_4$, $Cr(NO_3)_3$, $CoSO_4$, $MnSO_4$, $Fe(NO_3)_3$, $Ni(NO_3)_2$, $Cu(NO_3)_2$, $Zn(NO_3)_2$, $Ga(NO_3)_3$, $GeCl_4$, $K_6Ta_6O_{19}$, $Na_2MoO_4$, $KVO_3$, $K_7HNb_6O_{19}$, and $C_6H_5SnCl_3$. Preferred M′L sources include $Na_2MoO_4$, $KVO_3$, $K_7HNb_6O_{19}$ and $C_6H_5SnCl_3$.

Alternatively, the anions of formula (I) may be prepared by carrying out the steps for the synthesis of Preyssler's anion described in the Examples, while replacing a portion of the $Na_2WO_4 \cdot 2H_2O$ used in the preparation of Preyssler's anion with a source of M′L. In this case, the suitable and preferred sources of M′L are the same as those described above.

The selective encapsulation of $Z^{n+}$ with the anion of formula (I) may be carried out as follows. Generally, the anion of formula (I) is contacted, in an aqueous solution, with $Z^{n+}$. The order of addition is not critical. Thus, a solid salt containing the anion of formula (I) may be added to an aqueous solution of $Z^{n+}$ or a solid containing $Z^{n+}$ may be added to an aqueous solution containing the anion of formula (I). It is also possible to mix a solid containing $Z^{n+}$ with a solid salt containing the anion of formula (I) and then dissolve them by adding water or an aqueous solution.

The contacting of $Z^{n+}$ with the anion formula (I) may be carried out over a wide range of conditions. Particularly good results have been obtained by carrying out the contacting step at a temperature of 120° to 200° C., preferably 140° to 180° C., for a time of 5 to 30 hrs, preferably 10 to 15 hrs. The pressure is not critical, and the contacting step may be carried out at atmospheric pressure, slightly reduced pressure, or even elevated pressures as high as 5 atm, preferably 1–2 atm.

Although, the aqueous phase in which the anion of formula (I) and $Z^{n+}$ are contacted may contain a variety of additional components, it is preferred that the pH of the aqueous phase be maintained within a range of 2 to 10, preferably 4 to 8, during the contacting step.

After the contacting step is complete, the anion of formula (II) may be obtained in the form of an isolated salt by a number of methods. For example, addition of KCl to an aqueous solution will precipitate the anion of formula (II) in the form of the potassium salt. Other methods of isolating the anion of formula (II) include: (1) precipitation of other salts, e.g. $Cs^+$, and $NR_4^+$ (especially R=Me, Et, n-Pr); (2) Extraction into organic solvent, e.g. toluene, hexane by means of phase transfer agent $NR_4^+$; $R=C_7$ or greater. [general method described by Katsoulis and Pope, *J. Am. Chem. Soc.*, 1984, 106 2737]; and (3) absorption on to anion exchange material.

It should be understood that the present anions of formulae (I) and (II) may exist in the form of salts with a wide variety of one or more cations. The number of cations associated with the anions of formulae (I) or (II) will, of course, depend on the oxidation state of both the cations and anions. It should also be understood that, for any given encapsulation reaction as described above, the identity of the cations associated with the anion of formula (I) may differ from those associated with the anion of formula (II). Thus, it may be desired to start with a salt in which the cations are selected such that the anion of formula (I) is soluble in the aqueous phase under the contacting conditions and then add a salt containing cations that form an insoluble salt with the anion of formula (II) to precipitate the anion of formula (II) after the contacting step is complete.

Examples of cations which form soluble salts with the anions of formula (I) include $H^+$, $Li^+$, $Na^+$, $K^+$, and $NH_4^+$. Cations which form insoluble salts with the anions of formula (I) include $NMe_4^+$, $NEt_4^+$, $NPr_4^+$, $NMePh_3^{30}$, and $Cs^+$.

Figure 2:
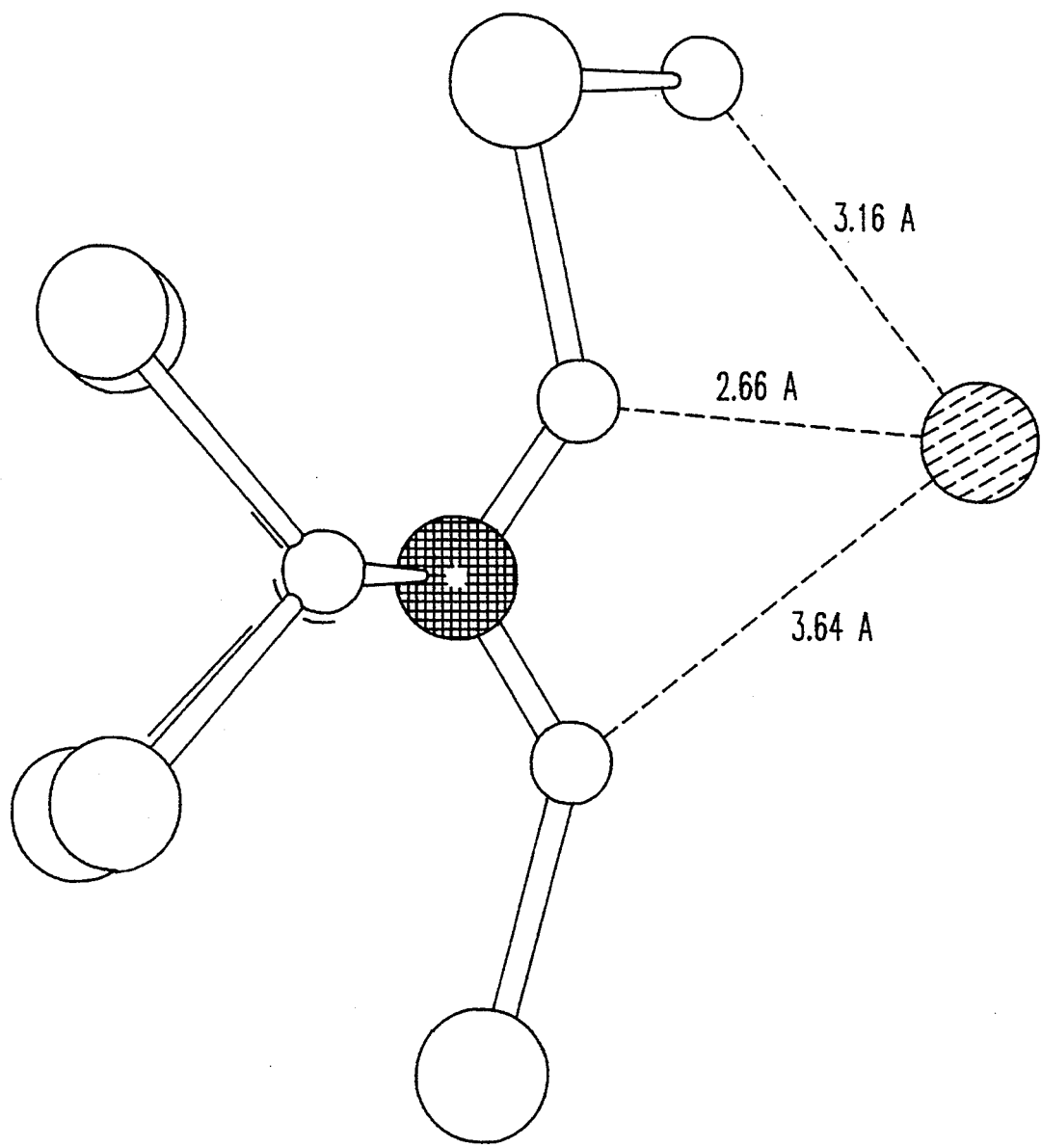
FIG. 2 illustrates the part of the $[NaP_5W_{30}O_{110}]^{14-}$ structure showing the position of the sodium atom relative to the tungsten atoms in inner and outer rings. Tungsten and oxygen atoms are shown as large and small circles, respectively, the phosphorus atom as a shaded circle, and the sodium atom as a dotted circle.

Although not intended to be limiting, the selective reaction of $Z^{n+}$ with the anion of formula (I) will now be further illustrated by way of a detailed discussion of the reaction of $Z^{n+}$ with $NaP_5W_{30}$. A crystallographic investigation (Alizadeh, M. H. et al, *J. Am. Chem. Soc.*, 1985, 107, 2662) of the so-called Preyssler anion revealed it to be $[NaP_5W_{30}O_{110}]^{14-}$ ($NaP_5W_{30}$) and not $[HP_3W_{18}O_{66}]^{8-}$ as first assigned by Preyssler (Preyssler, C., *Bull. Soc. Chim. Fr.*, 1970, 30). The anion has approximate $D_{5h}$ symmetry (see FIG. 1). It consists of five $PW_6O_{22}$ units derived from the Keggin anion $[PW_{12}O_{40}]^{3-}$, arranged in a crown so that the $[NaP_5W_{30}O_{110}]^{14-}$ anion has an unusual fivefold symmetry axis. The tungsten atoms are distributed in four parallel planes perpendicular to this axis. The two outer planes each contain five tungsten atoms and the two inner planes ten tungsten atoms. The structure leaves a cylindrical vacancy along the five-fold axis and the sodium ion is positioned in this vacancy, not in the center as might be expected, but in one of the inner oxygen planes so that it is coordinated to five oxygens in this plane and to five in an outer oxygen plane at a larger distance, see FIG. 2. The structure explained previously-recorded $^{31}P$ NMP (Massart, R. et al, *Inorg. Chem.*, 1977, 16 2916) which showed a single line for the five equivalent phosphorus atoms, and $^{183}W$ NMR (Acerete, R. et al, *Inorg. Chem.*, 1984, 23 1478) which gave four lines in a 2:2:1:1 ratio as expected from the dissymmetry introduced by the sodium ion. Sodium-23 NMR showed separate signals for internal and free cationic $Na^+$ (Alizadeh, M. H. et al, *J. Am. Chem. Soc.*, 1985, 107 2662).

The sodium ion was very tightly bound but could apparently be replaced under severe experimental conditions (heating in aqueous solution at 120° C. in a bomb) by $Ca^{2+}$, which has a similar radius (1.14 Å) (The "ionic radius" of a cation is known to depend upon its coordination number. In order to compare sizes of the different cations discussed in this application, the inventors have chosen the set of effective ionic radii of Shannon an Prewitt [*Acta Crystallogr.*, 1976, A32, 751] appropriate for six-fold coordination by oxide. The effective coordination number of the central atom in $P_5W_{30}$ is larger than six, of course, but sufficient reliable data are not available for larger coordination numbers) to $Na^+$(1.16 Å) (Alizadeh, M. H. et al, *J. Am. Chem. Soc.*, 1985, 107, 2662). The ionic radii of the trivalent lanthanides (Ln) (r=1.17 to 1.00 Å) are similar to those of $Na^+$ and $Ca^{2+}$, and $Ln^{3+}$ ions are often used to replace $Ca^{2+}$ in complexes in biological studies. Because of their higher charge the lanthanide complexes would be expected to be even more stable than those of $Na^+$ and $Ca^{2+}$.

The reaction between $Ca^{2+}$ and $NaP_5W_{30}$ has been shown (Alizadeh, M. H. et al, *J. Am. Chem. Soc.*, 1985, 107, 2662) to be accompanied by the appearance of $Na^+$ in the solution as measured with a sodium electrode, leading to the conclusion that $Ca^{2+}$ had replaced $Na^+$ in the cavity of the heteropolyanion. By reacting a neutral or slightly acid aqueous solution of $K_{12.5}Na_{1.5}[NaP_5W_{30}O_{110}]$ at 145°–180° C. with 1–2 equivalents of a variety of lanthanide and other metal ions having radii similar to that of $Na^+$, products were obtained which contained the reacting cations and which were characterized by cyclic voltammograms and $^{31}P$-NMR spectra that differed from that of $NaP_5W_{30}$, see below. The yields varied with the metal ion and temperature and are summarized in Table 1.

TABLE 1

Conditions and Yields for Preparation of $[ZP_5W_{30}O_{110}]$:

| $Z^{n+}$ | $T/°C$ | % yield |
|---|---|---|
| $Sm^{3+}$ | 160 | 90 |
| $Eu^{3+}$ | 145–165 | 45–90 |
| $Gd^{3+}$ | 145 | 90 |
| $Tb^{3+}$ | 145 | 90 |
| $Dy^{3+}$ | 160 | 90 |
| $Ho^{3+}$ | 160 | 90 |
| $Er^{3+}$ | 160 | 90 |
| $Tm^{3+}$ | 160 | 90 |
| $Yb^{3+}$ | 160–180 | 50–70 |
| $Lu^{3+}$ | 180 | 40 |
| $Ce^{4+}$ | 160 | 50 |
| $Y^{3+}$ | 160 | 90 |
| $Bi^{3+}$ | 160 | 90 |
| $U^{4+}$ | 160 | 30 |
| $Ca^{2+}$ | 140 | 90 |

$[NaP_5W_{30}O_{110}]^{14-} + Z^{n+} \rightarrow [ZP_5W_{30}O_{110}]^{(15-n)-} + Na^+$
$C[NaP_5W_{30}] = 8.0$ mM, $C_{Zn+} = 8{-}16$ mM While $Gd^{3+}$ and $Tb^{3+}$ reacted practically quantitatively at 145° C., $Eu^{3+}$ reacted only partly at this temperature but almost quantitatively at 165° C. The smaller lanthanide ions $Yb^{3+}$ and $Lu^{3+}$ required still higher temperatures and reacted only partly even at 180° C.

All lanthanide ions with ionic radii smaller or equal to that of $Sm^{3+}$ (r=1.10 Å) were found to react with $NaP_5W_{30}$, but no reaction was observed for the larger lanthanide ions $Nd^{3+}$ (r=1.12 Å), $Pr^{3+}$ (r=1.13 Å) and $Ce^{3+}$ (r=1.15 Å) even at temperatures up to 180° C. Assuming that the cations have replaced $Na^+$ in the central cavity, this behavior indicates an extraordinary and unprecedented size selectivity. Although $Sm^{3+}$ and $Nd_{3+}$ differ in ionic radius by only 0.02 Å, $Sm^{3+}$ readily entered the heteropolyanion, but no detectable reaction took place with the larger cations. In contrast, other lanthanide-containing heteropolyanions such as $[ln(PW_{11}O_{39})_2]^{11-}$ and $[Ln(SiW_{11}O_{39})_2]^{13-}$ can be made with all lanthanide ions (Peacock, R. D. et al, *J. Chem. Soc. (A)*, 1971, 1836; and Fedotov, M. A. et al, *Polyhedron*, 1990, 9, 1249).

Although not intended to be limiting, a possible explanation for the dramatic size selectivity of $P_5W_{30}O_{110}$ as compared to $[Ln(PW_{11}O_{39})_2]^{11-}$ and $[Ln(SiW_{10}O_{39})_2]^{13-}$ may be that the latter complexes are more flexible with the lanthanide ions sandwiched between to lacunary heteropolyanion ligands, while in the $P_5W_{30}W_{110}$ heteropolyanion the size of the central cation is restricted by the diameter of the cavity which may not have the flexibility to expand beyond a certain well defined size. The sudden cut-off between $Sm^{3+}$ and $Nd^{3+}$ is still surprising considering the capability of the lanthanide ions to adopt to a variety of coordination numbers with different effective ionic radii.

At the other end of the lanthanide series, $Yb^{3+}$ (r=1.01 Å) and $Lu^{3+}$ (r=1.00 Å) with the smallest ionic radii replaced $Na^+$ only partly. A possible, but not limiting explanation for this result is that these ions are too small to compete effectively with $Na^+$.

The smaller yields with $Ce^{4+}$ and $U_{4+}$ were partly due to the low solubility of the tetravalent cations with the heteropolyanion necessitating using lower concentrations of cations (<1 equivalent compared to two equivalents for the other metal ions). Not only did $Ce^{3+}$ not react with $NaP_5W_{30}$ as mentioned above, but no reduction could be observed of $Ce^{IV}P_5W_{30}$ in aqueous solution (see below) further illustrating the point that $Ce^{3+}$ might be too large for the cavity.

While ease of substitution of $Na^{30}$ by lanthanide ions seems to follow the size of their ionic radii strictly, substitution by other metal ions of similar size did not always proceed as expected. For example, $Y^{3+}$ (r=1.04 Å), $U^{4+}$ (r=1.03 Å), $Bi^{3+}$ (r=1.17 Å), and $Ce^{4+}$ (r=1.01 Å) did react, but other metal ions with similar radii such as $Ce^{2+}$ (r=1.09 Å), $Tl^{3+}$ (r=1.03 Å), $Sn^{2+}$, $Hg^{2+}$ (r=1.16 Å), and $Th^{4+}$ (r=1.08 Å) did not, under the same conditions. The fact that $Cd^{2+}$ did not react is especially surprising as the similarly sized $Ca^{2+}$ reacted readily. It is certainly possible that sterochemical ($Hg^{2+}$, $Sn^{2+}$) and "hard-soft" preferences might also contribute to reactivity - the polyanion cavity is lined with "hard" oxide ions.

The $ZP_5W_{30}$ ions were stable in aqueous solution for at least 3 weeks in 1 M HCl at 25° C., but a slow decomposition ($[XP_5W_{30}O_{110}]^{(15-n)-} \rightarrow WO_4^{2-}$, $HPO_4^{2-}$, $Z^{n+}$) took place at pH 9–10 with a halflife of about 2 days in a pH 10, 0.025 M borax buffer and several weeks at pH 9, as measured voltammetrically with $GdP_5W_{30}$ using a supporting electrolyte of 1 M $Na_2SO_4$.

When a solution containing $EuP_5W_{30}$ in 1 M NaCl was heated at 160° C. for 24 h, no detectable amount of $NaP_5W_{30}$ was observed although $LuP_5W_{30}$ under the same conditions gave mostly $NaP_5W_{30}$. These observations combined with the yields in the preparations of $ZP_5W_{30}$ (Table 1) show increased stability of $LnP_5W_{30}$ over $NaP_5W_{30}$, as expected from the more highly charged $Ln^{3+}$ ions, and that $LuP_5W_{30}$ is less stable than $EuP_5W_{30}$. This was further shown by the observation that $Eu^{3+}$ replaced ca 85% of $Lu^{3+}$ in $LuP_5W_{30}$ when a 2:1 mixture was heated at 160° C. for 20 hr.

The observation that different $Ln^{3+}$ ions reacted with $NaP_5W_{30}$ with different efficiency suggested that $NaP_5W_{30}$ might be used to separate mixtures of lanthanides. To test this notion some competition experiments were performed in which mixtures of two $Ln^{3+}$ ions and $NaP_5W_{30}$ in 1:1:1 ratio were heated at 160° C. for 20 hr and the products examined by $^{31}P$ NMR of the reaction mixture. Solutions containing $Sm^{3+}$ and the smaller $Yb^{3+}$ gave only $SmP_5W_{30}$ as product, while the neighboring $Sm^{3+}$ and $Eu^{3+}$ reacted to give a mixture of $SmP_5W_{30}$ and $EuP_5W_{30}$ in a 1:4 ratio. When mixtures of $Eu^{3+}$ and $Tb^{3+}$ were used $EuP_5W_{30}$ was the only product. It thus appears that $NaP_5W_{30}$ efficiently separates smaller $Ln^{3+}$ ions from larger ones and preferentially reacts with $Eu^{3+}$ rather than $Sm^{3+}$. Once incorporated in the heteropolyanion the free $Ln^{3+}$ ions can be recovered by basic hydrolysis.

IR Spectroscopy

The IR spectra of all the products were practically identical and differed only slightly from the parent $NaP_5W_{30}$ heteropolyanion; the only consistent differences being in the position and size of one of the P-O stretching bands (1073 cm$^{-1}$ (m) for $NaP_5W_{30}$ and 1060 cm$^{-1}$(s) for $ZP_5W_{30}$) and a better resolved peak at 980 cm$^{-1}$ for $NaP_5W_{30}$. The splitting of the 1160 cm$^{-1}$ P-O stretching band reported (Alizadeh, M. H. et al, *J. Am. Chem. Soc.*, 1985, 107, 2662) for $CAP_5W_{30}$ was not seen and may have been due to an impurity or artifact in the earlier spectrum.

NMR Spectroscopy

In the $^{23}Na$ NMR spectrum of $NaP_5W_{30}$ it was found that the coordinated sodium ion gave rise to a broad line at a slightly different frequency from that of the free sodium ion (Alizadeh, M. H. et al, *J. Am. Chem. Soc.*, 1985, 107, 2662). In order to test whether Na+ had indeed been replaced by the reacting cations in the ZP$_5$W$_{30}$ complexes $^{23}$Na NMR spectra of the acid (more soluble) forms of YP$_5$W$_{30}$ and NaP$_5$W$_{30}$ were attempted using the same conditions of concentration and instrumentation. The Y$^{3+}$ complex was chosen because it is diamagnetic so that no significant shift from NaP$_5$W$_{30}$ or line broadening would be expected if Na+ were still coordinated. No Na resonances were observed for YP$_5$W$_{30}$ supporting the notion that the observed reaction is indeed a displacement of Na+ by the reacting cations and not attachment at another site of the heteropolyanion.

The $^{31}$P NMR chemical shifts of ZP$_5$W$_{30}$ are shown in Table 2.

TABLE 2

| | $^{31}$P NMR spectra of ZP$_5$W$_{30}$ | | |
|---|---|---|---|
| Z$^{n+}$ | δ/ppm | Δν$_{\frac{1}{2}}$/Hz | LIS$_{obs}$$^a$ |
| Sm | −9.5 | 4.6 | +0.6 |
| Eu | 0.7 | 5.0 | +10.8 |
| Gd | — | — | — |
| Tb | −27.2 | 175 | −17.1 |
| Dy | −68.1 | 241 | −58.0 |
| Ho | −40.0 | 222 | −29.9 |
| Er | 1.8 | 151 | +11.9 |
| Tm | 17.6 | 68 | +27.7 |
| Yb | 9.1 | 16 | +19.2 |
| Lu | −10.1 | | — |
| Y | −10.2(d)$^b$ | | |
| Bi | −8.2 | | |
| Ce | −16.0 | 4.5 | |
| U | −15.5 | 5.5 | |
| Na | −9.4 | | |
| Ca | −11.1 | | |

$^a$Lanthanide induced shift, δ(Ln) − δ(Lu)
$^b$J(P—O—Y) = 1.6 Hz

A single $^{31}$P line was observed for all complexes except for YP$_5$W$_{30}$ which gave a doublet with a coupling constant of 1.6 Hz. These data confirm that all the phosphorus atoms are equivalent (as expected) in ZP$_5$W$_{30}$, the doublet in YP$_5$W$_{30}$ presumably being due to splitting caused by $^{89}$Y (100%, I=178 ). $^{31}$P NMR spectra of the ZP$_5$W$_{30}$ ions (Table 2) gave shifts for diamagnetic Z$^{3+}$ ions of −8.2 to −10.2 ppm; for NaP$_5$W$_{30}$ −9.4 ppm; for CaP$_5$W$_{30}$ −11.1 ppm; for CeP$_5$W$_{30}$ −16 ppm; and for UP$_5$W$_{30}$ −15.5 ppm. For the paramagnetic Ln$^{3+}$ ions the shifts varied from +18 to −68 ppm and widths varied from 5-240 Hz except for GdP$_5$W$_{30}$ which gave no observable spectrum.

Some of the lanthanides induced shifts to higher frequency, others to lower frequency, as was also observed for [LN(PW$_{11}$O$_{39}$)$_2$]$^{11−}$ (Fedotov, M. A. et al, *Polyhedron*, 1990, 9, 1249). The lanthanide induced shifts, LIS$_{obs}$, were taken as the observed shifts for LnP$_5$W$_{30}$ minus the observed shift for LuP$_5$W$_{30}$. LIS$_{OBS}$ are known (Sherry, A. D. et al, *Lanthanide Probes in Life, Chemical and Earth Sciences,* Bunzli and Choppin, Eds., Elsevier, 1989, and references therein; Bleaney, B., *J. Magn. Res.,* 1972, 8, 91; and Golding, R. M. et al, *Aust. J. Chem.,* 1972, 25, 2577) to be expressed as a sum of the pseudo-contact (dipolar, through-space) shift, LIS$_{pc}$, and the contact (scalar, through-bonds) shift, LIS$_c$.

$$LIS_{obs} = LIS_{pc} + LIS_c \quad (I)$$

$$LIS_{pc} = C_j \frac{[\beta^2 \langle r^2 \rangle 2A_2^0(3\cos^2\theta - 1) + \beta^2 \langle r^2 \rangle 2A_2^2 \sin^2\theta \cos 2\phi]}{60(kt)^2 r^3} \quad (Ia)$$

$$LIS_c = \frac{\left(\frac{A}{h}\right)^{(S_z)}}{\frac{\gamma B_o}{2\pi}} \quad (Ib)$$

where $C_j = g^2 J(J+1)(2J-1)(2J+3)\langle J|a|J\rangle$ and r, θ, ∠ are spherical coordinates of the observed nucleus (P) with respect to the lanthanide, β is the Bohr magneton, A is the electron-nuclear hyperfine coupling constant, γ is the magnetogyric ratio, $\langle r^2 \rangle 2A_2^0$ and $\langle r^2 \rangle A_2^2$ are ligand field terms, and the other symbols have their usual significance. Values of $C_j$ which determine shifts to higher or lower frequency, have been calculated by Bleaney (Bleaney, B., *J. Magn. Res.,* 1972, 8, 91) for each lanthanide ion. The spin expectation values $\langle S_z \rangle$ are tabulated by Golding and Halton (Golding, R. M. et al, *Aust. J. Chem.,* 1972, 25, 2577).

According to equations (Ia) and (Ib) a plot of the measured LIS$_{obs}$ values versus Bleaney's $C_j$ values should be linear if the origin of the shift is purely pseudo-contact and the complexes are isostructural. Deviation from linearity indicates that the measured LIS$_{obs}$ values are not purely pseudo-contact. Similarly a linear plot of LIS$_{obs}$ versus $\langle S_z \rangle$ would be expected for purely contact shifts. It has been suggested (Horrocks, W., in *NMR of Paramagnetic Molecules,* LaMar et al, eds., Academic Press, New York, 1973, p. 479) that isotropic shifts of nuclei four or more bonds removed from the lanthanide may be considered exclusively pseudo-contact in origin. In [Ln(PW$_{11}$O$_{39}$)$_2$]$^{11−}$ the phosphorus atom is four bonds away from Ln, and the LIS dependence found to be appreciably if not predominantly pseudo-contact by comparison of $c_j$ and LIS$_{obs}$ values (Fedotov, M. A. et al, *Polyhedron*, 1990, 9, 1249). The observed deviation from linearity in that case was ascribed to structural changes of the heteropolyanion as the lanthanide varied. In the present series of LnP$_5$W$_{30}$O$_{110}$, the lanthanide is separated from the phosphorus atoms by only two bonds. A plot of LIS$_{obs}$ versus $c_j$ showed a fairly good linear dependence (r$^2$=0.96) with only TbP$_5$W$_{30}$ deviating from the line. A plot of LIS$_{obs}$ versus $\langle S_z \rangle$ showed mainly scattering. It thus seems that the pseudo-contact term predominates for LnP$_5$W$_{30}$O$_{110}$ as well, even if the distance between Ln$^{3+}$ and P is only two bonds.

Rewriting equations (Ia)+(Ib) as LIS$_{obs}$=GC$_j$+F$\langle S_z \rangle$ or LIS$_{obs}$/$\langle S_z \rangle$=G(C$_j$/$\langle S_z \rangle$)+F allows one to determine G and F graphically, and to alculate the pseudo-contact contribution to LIS$_{obs}$ (Reilley C. N. et al, *Anal. Chem.,* 1976, 48, 1446). A plot of LIS$_{obs}$/$\langle S_z \rangle$ versus C$_j$/$\langle S_z \rangle$ gave a fairly linear plot (r$^2$=0.91) with G=0.67 and F=0.32. The fraction of LIS that may be ascribed to a pseudo-contact contribution may be estimated from $|GC_j|/(|F\langle S_z\rangle| + |GC_j|)$. Values ranging from 78-96% pseudo-contact were calculated for the coordinated lanthanide ions except for Eu$^{3+}$ which gave 44%. The LIS of the samarium derivative was too small to be evaluated accurately and the Gd complex should only have a contact shift, if it could have been observed. It is not inconceivable that some minor structural changes occur along the lanthanide-heteropolyanion series due to the differences in ionic radius of $Ln^{3+}$, but no obvious pattern was evident.

Figure 3A:
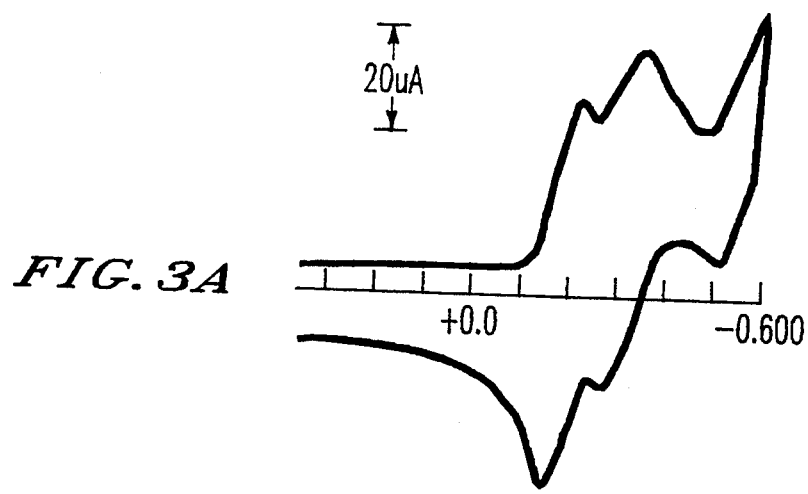
FIGS. 3a–c are cyclic voltammograms of A: $[NaP_5W_{30}O_{110}]^{14-}$ and B: $[GdP_5W_{30}O_{110}]^{12-}$, $10^{-3}$ M in 1 m HCl and C: $[GdP_5W_{30}O_{110}]^{12-}$, $10^{-3}$ M at pH 10.0 (0.025 M Borax/NaOH, 1 M $Na_2SO_4$). Glassy carbon working electrode, Ag/AgCl reference electrode, sweep rate 200 mV/s.
Figure 3B:
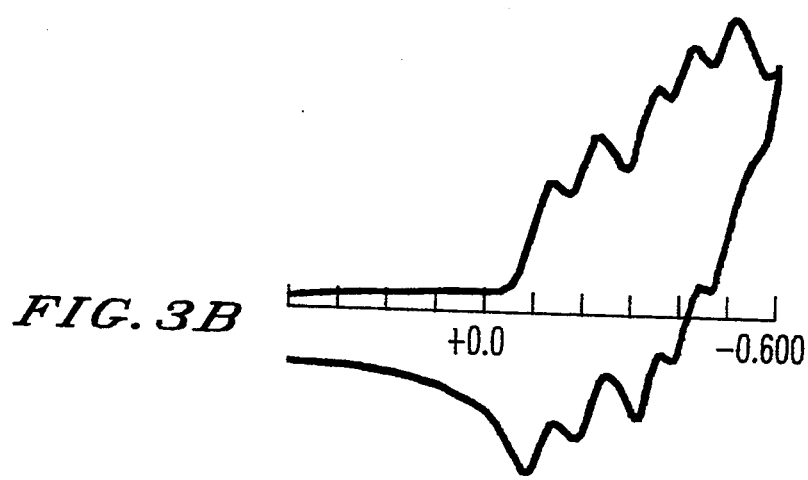
Figure 3C:
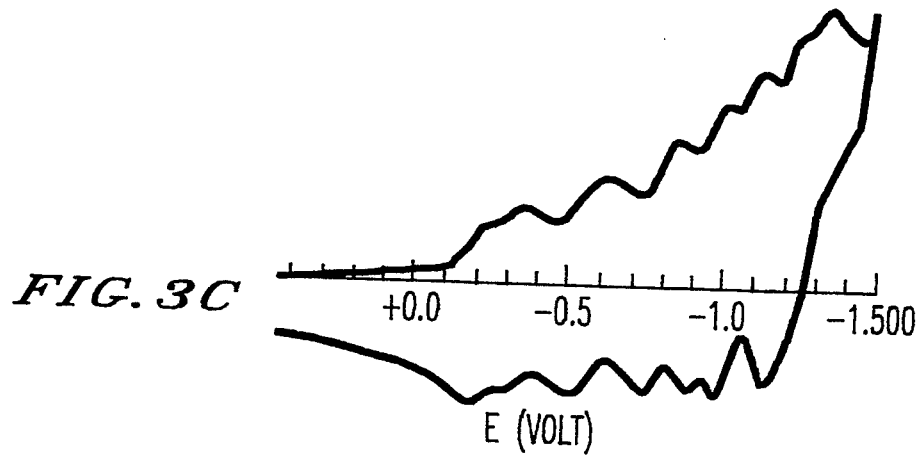

The $^{183}W$ NMR spectrum of $EuP_5P_5W_{30}$ gave four lines at 62.5 ppm (d, 5W, It is another object of the present invention to $^2J_{P-O-W}=3.8$ Hz), $-201.7$ ppm (s, 10W), 31 209.5 ppm (s, 10W), and $-297.5$ ppm (d, 5W, $^2J_{P-O-W}=1.9$ Hz) with an intensity ratio of 1:2:2:1. This spectrum is comparable to that of $NaP_5W_{30}$ which consists of four lines at $-209.6$ ppm (d, 10W, $^2J_{P-O-W}=1.25$ Hz), $-211.6$ ppm (d, 10W, $^2J_{P-O-W}=1.28$ Hz), $-277.25$ ppm (d, 5W, $^2J_{P-O-W}=1.27$ Hz), and $-289.6$ ppm (d, 5W,$^2$ $J_{P-O-W}=1.32$ Hz. The major difference between the two $^{183}W$ NMR spectra is in the downfield shift of one of the 5W lines by ca 350 ppm. In the $[LN(PW_{11}O_{39})_2]$ series it was observed that only resonances for the tungsten atoms that were two bonds away from the paramagnetic ion were shifted significantly in comparison to the diamagnetic analogs (Fedotov, M. A. et al, Polyhedron, 1990, 9 1249). The observation that the $^{183}W$ spectrum of $EuP_5W_{30}$ displays the same pattern as that of $NaP_5W_{30}$ with only one of the 5W lines displaced significantly to a different frequency confirms that $Eu^{3+}$ has replaced $Na^{30}$ and occupies a similar site in the complex as did $Na^+$, being closer to one of the outer 5-tungsten planes than to the other (see FIG. 2). Al illustrated in FIG. 3, the sodium in $NaP_5W_{30}$ is connected to tungsten in the closest outer plan via oxygen atoms which are 2.66 Å from the metal ion, while the Na-O distance in Na-O-W to the other outer ring was 3.64 Å. Tungstens in the inner 10-tungsten rings are four bonds removed from the central ion, and by comparison to $Ln(PW_{11}O_{39})_2$ would not be expected to be strongly shifted by a paramagnetic species.

Electrochemistry

As for the parent $NaP_5W_{30}$, several reduction steps to heteropoly blue species were observed for $ZP_5W_{30}$. In 1 M HCl there are five essentially reversible two-electron reduction steps ($\Delta=30-40$ mV) for all $ZP_5W_{30}$ anions down to $-600$ mV except for $EuP_5W_{30}$ and $CaP_5W_{30}$ which showed only four reduction steps, as shown in Table 3.

TABLE 3

Voltammetric Reduction Potentials$^a$ for $[ZP_5W_{30}O_{110}]^{n-}$

| $Z^{n+}$ | E/V vs Ag/AgCl | | | | |
|---|---|---|---|---|---|
| $Sm^{3+}$ | −0.11 | −0.20 | −0.32 | −0.40 | −0.40 |
| $Eu^{3+}$ | −0.12 | −0.22 | −0.32$^b$ | | −0.49 |
| $Gd^{3+}$ | −0.11 | −0.21 | −0.33 | −0.41 | −0.49 |
| $Tb^{3+}$ | −0.10 | −0.20 | −0.32 | −0.41 | −0.48 |
| $Dy^{3+}$ | −0.12 | −0.21 | −0.34 | −0.41 | −0.50 |
| $Ho^{3+}$ | −0.12 | −0.21 | −0.32 | −0.41 | −0.50 |
| $Er^{3+}$ | −0.11 | −0.20 | −0.32 | −0.40 | −0.49 |
| $Tm^{3+}$ | −0.10 | −0.20 | −0.31 | −0.39 | −0.49 |
| $Yb^{3+}$ | −0.13 | −0.22 | −0.34 | −0.41 | −0.50 |
| $Lu^{3+}$ | −0.10 | −0.20 | −0.31 | −0.38 | −0.49 |
| $Y^{3+}$ | −0.11 | −0.20 | −0.32 | −0.40 | −0.49 |
| $Bi^{3+}$ | −0.11 | −0.19 | −0.27 | −0.34 | −0.45 |
| $Ce^{4+}$ | −0.10 | −0.20 | −0.31 | −0.39 | −0.46 |
| $U^{4+}$ | −0.08 | −0.18 | −0.32 | −0.46 | −0.53 |
| $Na^+$ | −0.18$^b$ | | −0.30$^b$ | | −0.52 |
| $Ca^{2+}$ | −0.16 | −0.21 | −0.33$^b$ | | −0.49 |

Figure 4:
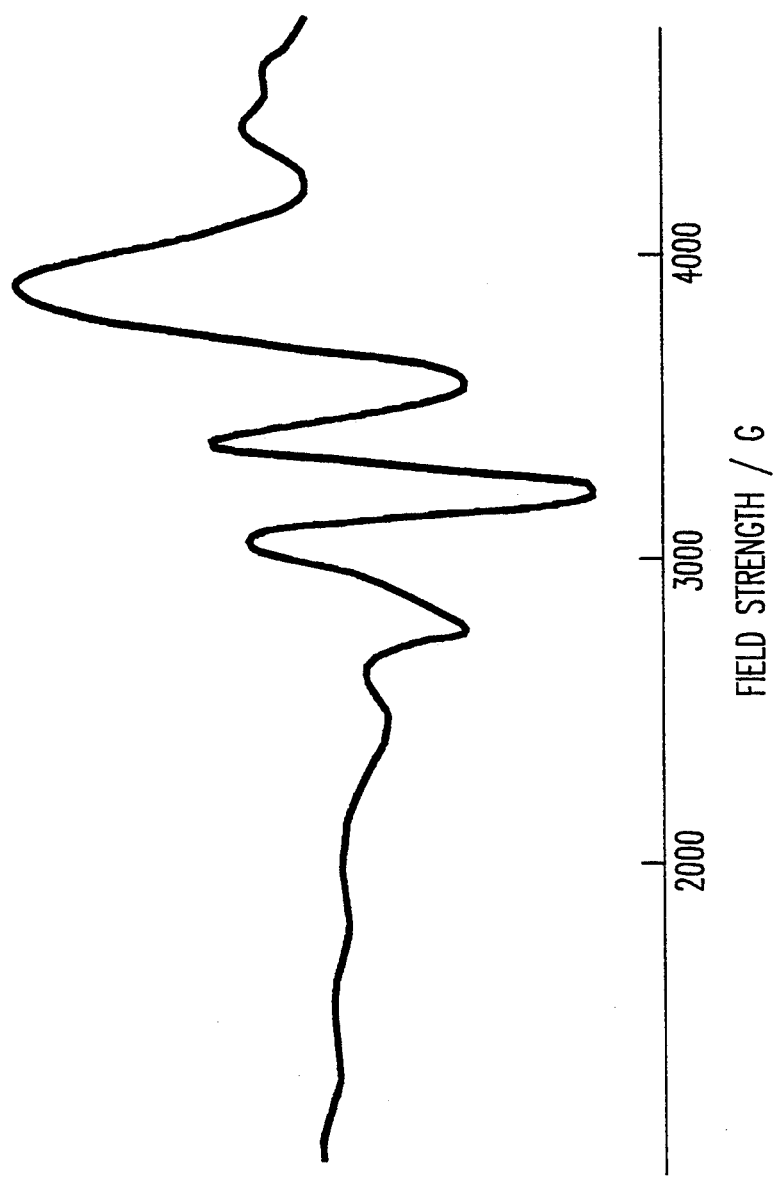
FIG. 4 is an X-Band ESR spectrum of powdered $K_{12}[GdP_5W_{30}O_{110}]$ at 298° K.

$^a\frac{1}{2}(E_{pc} + E_{pa})$, 1.0M HCl; All are 2-electron steps except where noted
$^b$4-electron step This pattern contrasts with that of $NaP_5W_{30}$ under the same conditions, which showed two reduction steps of four electrons each at $-0.18$ and $-0.30$ V and one additional multielectron step at $-0.52$ V (see FIG. 4). It thus appears that the first two reduction steps of the $NaP_5W_{30}$ ion have split into four two electron steps in the $ZP_5W_{30}$ ions, (except for $EuP_5W_{30}$ and $CaP_5W_{30}$, where only the first step was split).

At higher pH, further splitting of the reduction steps occurs, as is commonly observed for other heteropolyanions (Pope, M. T., Heteropoly and Isopoly Oxometalates, Springer-Verlag, New York, 1983) and is attributed to the deprotonation of the reduced species. At pH 5-10 eight reductions were observed between 0 and $-1400$ mV for most $ZP_5W_{30}$, the first two reductions involving one-electron processes, see FIG. 4. While the one-electron steps were nearly reversible ($\Delta E \sim 60$ mV), the others were less so ($\Delta E$ varied from 80 to 160 mV).

No oxidations or reductions of the central cation were observed for any $ZP_5W_{30}$ in aqueous solution, which is surprising. Heteropolyanions are known (Ortega, F. et al, Inorg. Chem., 1984, 23 3292) to stabilize higher oxidation states of coordinated metal ions probably because of the high negative charges of the polyanion. A reversible $U^{4+/5+}$ oxidation step has been observed (Termes, S. C. et al, Trans. Met. Chem., 1978, 3 103) at $+0.94$ V vs SCE ($+0.96$ V vs Ag/AgCl) for $[U^{IV}(PW_{11}O_{39})_2]^{10-}$ in 1 M $H_2SO_4$. No such step was observed for the present $UP_5W_{30}$ at potentials as high as $+1.8$ V vs Ag/AgCl.

The question arises as to whether the isolated $CeP_5W_{30}$ contains Ce(III) or Ce(IV). No Ce(IV/III) CV reduction waves were observed between $+1.8$ and $-0.1$ V. Between $-0.1$ and $-1.4$ V several W(VI/V) waves appear, but this part of the cyclic voltammogram was identical to those of other $LnP_5W_{30}$. Also an attempted controlled potential electrolysis at $+0.1$ V in a 1 M HCl solution showed no evidence of reduction. Ce(IV) compounds are generally known to be strong oxidants ($E°_{Ce(IV/III)} = +1.44$ V (vs NHE) om 1 M $H_2SO_4$) and several Ce(IV) heteropolyanions, such as $[CeW_{10}O_{36}]^{8-}$, $[Ce(SiW_{11}O_{39})_2]^{12-}$, $[Ce(PW_{11}O_{39})_2]^{10-}$, $[Ce(P_2W_{17}O_{61})_2]^{16-}$ have measured Ce(III/IV) redox potentials of $+1.1$ to $+0.8$ V[17].

Although most Ce(III) compounds are colorless, the Ce(III) heteropolyanions are light brown due to $Ce^{III} \rightarrow W^{VI}$ charge transfer. That the present light yellow $CeP_5W_{30}$ complex is indeed a Ce(IV) compound is thus not evident from its colory only. The $^{31}P$ NMR spectrum shows a fairly small downfield shift (5 ppm) from the diamagnetic $LuP_5W_{30}$. This shift is similar in magnitude to the shift observed for paramagnetic $[Ce^{III}(PW_{11}O_{39})_2]^{11-}$ and is also similar to the $^{31}P$ chemical shift of $UP_5W_{30}$ which has two unpaired electrons. However, these shifts are relatively small so $^{31}P$ NMR does not solve the question of the oxidation state of cerium in $CeP_5W_{30}$. The most compelling evidence for $Ce^{IV}P_5W_{30}$ comes from its method of preparation. Cerium(III) did not react with $NaP_5W_{30}$ while Ce(IV) did so readily. Indeed by comparison with the other lanthanide ions Ce(III) (r=1.15 Å) should be too big to enter the heteropolyanion while Ce(IV) (r=1.01 Å) has the right size. That no reduction of Ce(IV)$P_5W_{30}$ was observed down to $-1.4$ V shows an extraordinary stabilization of the Ce(IV) oxidation state by the $P_5W_{30}O_{110}$ anion, a stabilization which seems likely to b due to the inability of the ligand to expand its cavity to accommodate the larger Ce(III) ion.

ESR Spectroscopy

Figure 5:
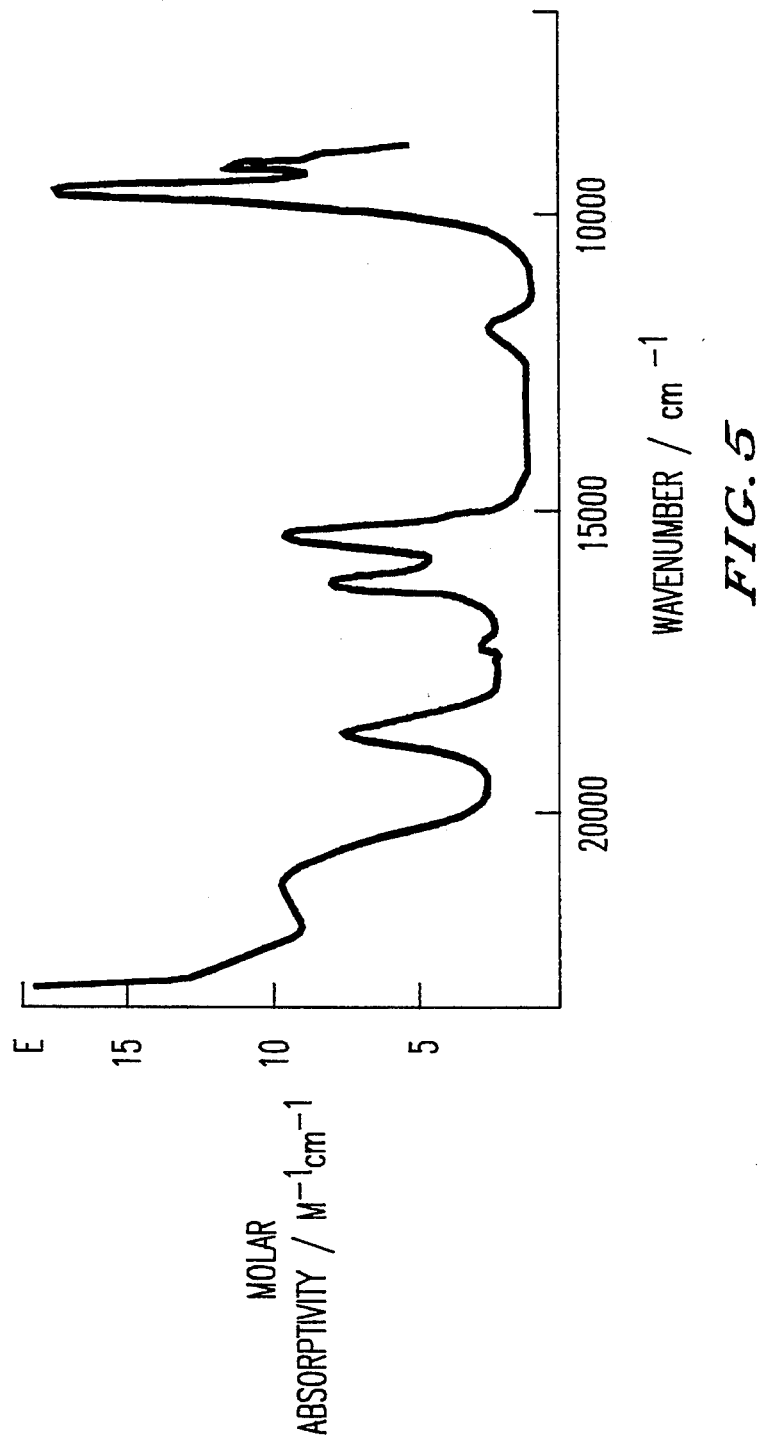
FIG. 5 is a visible-near IR absorption spectrum of $[UP_5W_{30}O_{110}]^{11-}$ in 1 M $H_2SO_4$.

The room temperature X-brand ESR spectrum of $GdP_5W_{30}$, recorded on a polycrystalline sample of $GdP_5W_{30}$, diluted 1:2 in a $TbP_5W_{30}$ matrix, is shown in FIG. 5. The spectrum arises from transitions between the four Kramers doublets of the $^8S_{7/2}$ ground state of Gd(III) (Stephens, E. M., In *Lanthanide Probes in Life, Chemical and Earth Sciences*, Bunzli and Choppin eds., Elsevier, 1989, and references therein). When the zero-field splitting is small as is the case here, seven allowed transitions are observed at each orientation of the crystal. The powder spectrum represents the sum of individual spectra of all possible orientations. A spectrum recorded at 77° K showed no additional features.

Electronic spectroscopy

All $ZP_5W_{30}$ complexes absorb strongly in the UV. The low intensity electronic absorption spectrum of $UP_5W_{30}$ is shown in FIG. 6. It is broadly similar, but not identical, to that of $[U(IV)Mo_{12}O_{42}]^{8-}$ (Reilley, C. N. et al, *anal. Chem.*, 1976, 48 1446). A concentrated solution of $EuP_5W_{30}$ showed weak absorbances at 464 nm ($^7F_0 \rightarrow {}^5D_2$) and 525 nm ($^7F_0 \rightarrow {}^5D_1$). Intense polytungstate absorption below 400 nm obscured further Eu bands.

Emission Spectroscopy

Excitation of a ca 0.2 M aqueous solution of $H_{12}[EuP_5W_{30}O_{110}]$ into the 464.7 nm $Eu^{3+}$ absorption line at 30° C. gave the emission spectrum presented in FIG. 7. The spectrum shows broad bands at positions characteristic for $EU^{3+}$ luminescence arising from transitions $^5D_0 \rightarrow {}^7F_j$. The strongest emissions are in the $^5D_0 \rightarrow {}^7F_1$ and $^7F_3$ transition is weak and the $^5D_0 \rightarrow {}^7F_0$ is either absent or obscured by the $^5D_0 \rightarrow {}^7F_1$ band. The poor resolution of the bands does not allow any detailed analysis of the symmetry and structural nature of the $Eu^{3+}$ coordination site (Gallagher, P. K. *J. Chem. Phys.*, 1964, 41 3061). No emission was observed from solid powdered samples at room temperature or at 0° C. In this respect it resembles $K_{17}Eu(P_2W_{17}O_{61})_2$ (Blasse, G., et al, *J. Inorg. Nucl. Chem.*, 1981, 43, 2847.

Relaxation Studies

Labile $Gd^{3+}$ complexes with inner sphere coordinated water are known to effectively catalyze the proton relaxation of water. A measure of this effect is the relaxativity, R, which is obtained as the slope of $T_1^{-1}$ versus concentration of the Gd complex. The relaxivity is dependent on the hydration number so that for $[Gd(H_2O)_{8-9}]^{3+}$, $R = 9.1$ mM s$^{-1}$ measured at 20 and 90 MHz, for $[Gd(H_2O)_{2-3}]^{3+}$, $R = 4.6$ mM S$^{-1}$ (90 MHz) and for $[Gd(H_2O)_{ca0}]^{3+}$ $R = 2.0$ mM S$^{-1}$ (20 MHz) (Laufler, R. B., *Chem. Rev.*, 1987, 87, 901). One way to determine whether $Gd^{3+}$ is indeed situated in the cavity of the $P_5W_{30}$ heteropolyanion where it would have no possibility to be coordinated by water, is to measure its relaxativity. At 21° C. a preliminary value of ca 1.0 mM s$^{-1}$ was obtained at 300 MHz using an inversion-recovery sequence. Relaxativities are frequency dependent, but the very low value found seems to confirm that $Gd^{3+}$ in $GdP_5W_{30}$ does not have the ability to exchange coordinated water with bulk water and is indeed situated in the cavity.

Thus, it has proven possible to replace Na$^+$ in the stable $[NaP_5W_{30}O_{110}]^{14-}$ with various (but not all) lanthanide and other metal ions having similar ionic radii to that of Na$^+$. That the observed reactions were actual substitution reactions of Na$^+$ and not substitution of the metal ions at another site of the heteropolyanion has been shown by a variety of techniques. The lanthanide ions react with different efficiency; the medium sized ions are the most reactive, the smallest react with difficulty, and the largest, Nd$^{3+}$, Pr$^{3+}$, and Ce$^{3+}$, not at all. The difference in reactivity proves useful in separating mixtures of lanthanides. Cerium(IV) reacts readily, but the product could not be reduced to Ce$^{III}P_5W_{30}$ at potentials more positive than $-1.4$ V, probably because the cavity in the heteropolyanion is too small to accommodate the larger Ce(III) ion. This is an unprecedented large stabilization of a Ce(IV) compound.

Despite the large negative charge on $[UP_5W_{30}O_{110}]^{11-}$ no oxidation of $U(IV)P_5W_{30}$ to $U(V)P_5W_{30}$ is observed. While it is conceivable that the cavity cannot expand to hold the larger Ce(III) ion, it is not clear why a smaller U(V) ion cannot be generated, as it has been observed in other heteropolyanions of similar charge.

The complexes exhibited extraordinary stability towards hydrolysis for heteropolyanions, covering a range from 6 M HCl to pH 9-10.

The present method of encapsulation is particularly useful for the separation of radioactive lanthanides from the aqueous phase obtained after the leaching step in the reprocessing of nuclear fuel. In this case, the anion of formula (I) is added, either in the form of a solid salt or a salt dissolved in water or an aqueous solution, to an aqueous phase obtained by leaching spent nuclear fuel with HNO$_3$. Preferably the pH of the aqueous phase is adjusted to 2 to 10, most preferably 4 to 8, before the addition of the anion of formula (I).

The present method is also particularly useful for the separation, purification, and encapsulation for long-term storage of U, Np, Pu, and Am from fission products. In this embodiment the actinides, U, Np, Pu, and Am, will not be bound by the anion of formula (I) so long as they are not in the '4 oxidation state. Conveniently, the actinides may be selectively oxidized to $MO_x^{2+}$ by oxidizing agents such as Cl$_2$, K$_2$Cr$_2$O$_7$, HClO$_4$, K$_2$S$_2$O$_8$, as described in Fahey, J. A., *The Chemistry of the Actinide Elements*, Katz, J. J., Seaborg, G. T., and Morss, L. R., eds., 2nd ed., Chapman and Hall, New York, 1986, vol.1, pp. 443-498; and Weigl, F., Katz, J. J., and Seaborg, G. T., ibid, pp. 499-886. After removal of the lanthanide complexes, the actinides may be selectively reduced to the +4 oxidation state with reagents such as Fe$^{2+}$, Zn, I$^-$, NO$_2^-$ as described in Fahey, J. A., *The Chemistry of the Actinide Elements*, Katz, J. J., Seaborg, G. T., and Morss, L. R., eds., 2nd ed., Chapman and Hall, New York, 1986, vol.1, pp. 4443-498; and Weigl, F., Katz, J. J., and Seaborg, G. T., ibid, pp. 499-886. In fact, as described in Fahey, J. A., *The Chemistry of the Actinide Elements*, Katz, J. J., Seaborg, G. T., and Morss, L. R., eds., 2nd ed., Chapman and Hall, New York, 1986, vol.1, pp. 443-498; Weigl, F., Katz, J. J.; and Seaborg, G. T., ibid, pp. 499-886; and Ryberg, J. and Sillen, L. G., *Acta Chem. Scand.*, 1955, 9, 1241, it is possible to arrange conditions such that only one of U, Np, Pu, and Am is in the +4 oxidation state. Once the actinide(s) are in the +4 oxidation state they may be separated by the addition of the anion of formula (I), as described above.

In many cases, it will be desired to vitrify the salt containing the anion of formula (II) to obtain a glass suitable for long term storage of the radioactive lanthanide or actinide. Such vitrification procedures are well known by those skilled in the art. Typically, a salt containing an anion of formula (II) is heated to a temperature of 1000° to 1200° C., for a time of 2 to 4 hrs. It may be preferred to add certain additional ingredients to the salt containing the anion of formula (II) prior to the vitrification step to adjust the properties of the resulting glass. Such additional ingredients include, for example, silica and borax.

The glass prepared as described above may then be placed in stainless steel or ceramic containers prior to storage. Additional layers of materials such as lead, titanium, copper, gold, graphite, ceramics, etc. may be added before storage. The methods of encapsulating glasses containing radioactive wastes prior to long term storage are reviewed in G. R. Choppin and J. Rydberg, *Nuclear Chemistry*, Pergamon, Oxford, pp. 502-559, 1980, which is incorporated herein by reference.

Alternatively, it is also possible to convert the salt containing the anion of formula (II) to a mixed valence tungsten "bronze" material by reduction with, e.g., hydrogen. Such tungsten "bronze" materials are stable enough for long-term storage even without vitrification. These tungsten "bronze" materials may be prepared by the procedures described in Nikitina, E. A.; Kokurina, A. S., *Zh. Obshch. Khim*, 1950, 20, 1380; 1951, 21, 1181, 1395, 1940; *J. Gen. Chem (USSR)*, 1951, 21, 1527 [*Chem. Abs.*, 45, 1894d; 46, 3441i; 10033b; 49, 8724h], which are incorporated herein by reference.

Although some of the anions of formula (I) have been previously reported, a number of these anions are novel. Thus, in another embodiment, the present invention provides novel anions of the formula (Ia)

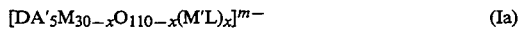

$$[DA'_5M_{30-x}O_{110-x}(M'L)_x]^{m-} \quad \text{(Ia)}$$

in which D is $Na^+$, $Ca^{+2}$ or ann ion of similar size; M is $W^{6+}$, $W^{5+}$ or mixtures thereof; M' is any metallic element from groups 2 to 15 of the periodic table; L is $O^{2-}$, $OH^-$, $H_2O$ or another suitable ligand, A' is P, As, Sb, Si, Ge, or combinations thereof; x is 0-10; and m is the charge based on the valence states of the atoms, typically 10-20, with the following provisos: (a) every occurrence of A' is not P when x is 0; and (b) every occurrence of A' is not P, M' is not V, and L is not O, when x is 1.

In the definition of the anions of formula (Ia), M' may be any metallic element selected from groups 2 to 15 of the periodic table. Preferred metals for M' include Ti, V, Cr, Mn, Fe, Co, Ni, Cu, Zn, Ga, Ge, Sn, Nb, Ta, Mo, and combinations thereof. Particularly preferred metals for M' include Mo, V, Nb, Ta, and combinations thereof.

Suitably, A' is an element selected from the group consisting of P, As, Sb, Si, Ge, and combinations thereof. It is preferred that A is P, As or combinations thereof. It is particularly preferred at A is phosphorus. The choice of L will, in part, depend on the identity of M'. However, the identification and selection of the appropriate choice for L is within the abilities of one having ordinary skill in the art.

The preparation of the novel compounds of formula (Ia) may be carried out as described for the compounds of formula (I).

It should be understood that, within the context of the present application, the salts of the anions of formulae I, Ia and II, include any and all hydrates of the corresponding salts.

Other features of the invention will become apparent in the course of the following descriptions of exemplary embodiments which are given for illustration of the invention and are not intended to be limiting thereof.

EXAMPLES $K_{12.5}Na_{1.5}[NaP_5W_{30}O_{110}] \cdot 15\ H_2O$ was prepared either according to Jeannin, Y. et al, *Inorg. Synth.*, 1991, 27, 115 or by the following method: $Na_2WO_4 \cdot 2H_2O$ (33 g) was dissolved in water (30 mL) and 85% $H_3PO_4$ (26.5 ml) was added. The mixture was placed in a sample preparation bomb (Parr 4748), which was heated at 120° C. overnight. After cooling to room temperature, water (15 ml) was added to the slightly yellow solution, followed by solid KCl (10 g). The precipitate was separated by filtration and washed with 2 M potassium acetate and methanol. When dry, it was dissolved in hot water (30 ml). On cooling to room temperature white crystals formed. A second recrystallization gave the pure product. Yield 8.8 g (33% based on $Na_2WO_4$). The IR spectrum and cyclic voltammogram were as previously reported (Alizadeh, M. H., et al, *J. Am. Chem. soc.*, 1985, 107 2662).

$[ZP_5W_{30}O_{110}]^{n-}$ salts. In a typical experiment $K_{12.5}Na_{1.5}[NaP_5W_{30}O_{110}] \cdot 15H_2)$ (1 g) was dissolved in 12 ml of water or dilute acid (<1 M HCl) and the solution was heated to 60°-70° C. To this solution was dropwise added two equivalents of $Z^{n+}$, the replacing cation, as the chloride or nitrate salt dissolved in water (3 ml). If a persistent precipitate appeared ($Z=Ce^{4+}$, $U^{4+}$) the addition was stopped after one equivalent of $Z^{n+}$ had been added. The mixture was placed in a Parr 4746 or 4748 sample preparation bomb and heated to 140°-180° C. overnight. After the solution had cooled to room temperature, the product was isolated by the addition of 4 g solid KCl. In some cases when the exchange was not complete (monitored by cyclic voltammetry), unreacted $NaP_5W_{30}$ was precipitated first by addition of a small amount of KCl. After filtration, the fitrate was treated with additional KCl to precipitate the product, which was filtered off, washed with ice water, and air-dried. Yields varied from 45 to 90% of isolated material (See Table 1).

All products were colorless except $CeP_5W_{30}$ which was light yellow and $UP_5W_{30}$ which was light yellow-green. They were identified by cyclic voltammetry, Ir, $^{31}P$ NMR, $^{183}W$ NMR, $^{23}Na$ NMR, electronic spectra of $EuP_5W_{30}$ and $UP_5W_{30}$, and EPR and elemental analysis of $GdP_5W_{30}$. Anal. Calcd. (found) for $K_{12}[GdP_5W_{30}O_{110}] \cdot 54\ H_2O$: K, 5.3(5.2); W, 61.1(61.1); Gd, 2.1(1.7); P, 2.2(1.7). Elemental analysis was performed by E+R Microanalytical Laboratory, Inc., Corona, N.Y.

The free acid of $EuP_5W_{30}$ was prepared by ion exchange of the potassium salt on a column of Bio-Rad AG 50W-X2 resin, 50-100 mest. The eluate was concentrated for electronic and NMR spectroscopy on a rotary evaporator.

Physical Measurements

Electrochemical measurements were made using a BAS-100A Electrochemical Analyzer with a PWR-3 Power Module/Potentiostat. CV (cyclic voltammetry) measurements were performed using a glassy carbon working electrode and a Ag/AgCl reference electrode. Unless other wise stated all potentials quoted in this paper are vs Ag/AgCl. For controlled potential electrolysis a platinum gauze electrode was used vs a saturated calomel reference electrode. NMR spectra were recorded on a Bruker AM-300 WB spectrometer operating at a magnetic field of 300.10 MHz for protons. The resonance frequencies were 12.505 MHz for $^{183}W$, 121.496 MHz for $^{31}P$, and 79.391 MHz for $^{23}Na$. The chemical shift standards were saturated $Na_2WO_4$ in $D_2O$ for $^{183}W$, 85% $H_3PO_4$ for $^{31}P$, and 1 M $NaCO_3$ for $^{23}Na$. All NMR spectra were recorded at 21° C. on samples dissolved in water containing ca 15% $D_2O$. ESR spectra were recorded on a Varian E-4 spectrometer. A Spex Fluorolog spectrofluorimeter equipped with a xenon lamp was used for the emission measurements.

Obviously, numerous modifications and variations of the present invention are possible in light of the above teachings. It is therefore to be understood that, within the scope of the appended claims, the invention may be practices otherwise than as specifically described herein.

What is claimed as new and desired to be secured by Letters Patent of the United States is:

1. A method of encapsulating a cation, comprising (i) contacting, in an aqueous solution, an anion of formula (I):

$$[DA_5M_{30-x}O_{110-x}(M'L)_x]^{m-} \qquad (I)$$

wherein D is Na$^+$ or Ca$^+$; M is W$^{6+}$, W$^{5+}$, or mixtures thereof; M' is a metallic element selected from the group consisting of Mo, V, Nb, Ta, and combinations thereof; L is O$^{2-}$, OH$^-$, or H$_2$O; A is P, As, Sb, Si, Ge or combinations thereof; x is 0–10; and m is an integer of 10 to 20; with a cation Z$^{n+}$ to obtain an anion of the formula (II):

$$[ZA_5M_{30-x}O_{110-x}(M'L)_x]^{(m+1-n)-} \qquad (II)$$

wherein n is 3 or 4, Z=Sm, Eu, Gd, Tb, Dy, Ho, Er, Tm, Yb, Lu, Y, or Bi, when n=3, and Z=Ce, U, Np, Pu, or Am, when n=4; and (ii) separating said anion of formula (II) from said aqueous solution.

2. The method of claim 1, wherein D is Na, x is 0, A is P, and m is 14.

3. In a method of reprocessing spent nuclear reactor fuel, comprising separating a cation from an aqueous solution comprising said cation, the improvement being that said separating comprises contacting, in an aqueous solution, an anion of formula (I):

$$[DA_5M_{30-x}O_{110-x}(M'L)_x]^{m-} \qquad (I)$$

wherein D is Na$^+$ or Ca$^+$; M is W$^{6+}$, W$^{5+}$, or mixtures thereof; M' is a metallic element selected from the group consisting of Mo, V, Nb, Ta, and combinations thereof; L is O$^{2-}$, OH$^-$, or H$_2$O; A is P, As, Sb, Si, Ge or combination thereof; x is 0–10; and m is an integer of 10 to 29; with a cation Z$^{n+}$ to obtain an anion of the formula (II):

$$[ZA_5M_{30-x}O_{110-x}(M'L)_x]^{(m+1-n)-} \qquad (II)$$

wherein n is 3 or 4; Z=Sm, Eu, Gd, Tb, Dy, Ho, Er, Tm, Yb, Lu, Y, or Bi, when n=3, and Z=Ce, U, Np, Pu, or Am, when n=4.

4. The method of claim 3, wherein D is Na, x is 0, A is P, and m is 14.

5. The method of claim 3, wherein said separating further comprises precipitating said anion of formula (II) in the form of an insoluble salt.

6. A composition of matter of the formula (II):

$$[ZA_5M_{30-x}O_{110-x}(M'L)_x]^{(m+1-n)-} \qquad (II)$$

wherein n is 3 or 4, Z=Sm, Eu, Gd, Tb, Dy, Ho, Er, Tm, Yb, Lu, Y, or Bi, when n=3, and Z=Ce, U, Np, Pu, or Am, when n=4; A is P, As, Sb, Si, Ge, or combinations thereof; M is W$^{6+}$, W$^{5+}$ or mixtures thereof; M' is a metallic element selected from the group consisting of Mo, V, Nb, Ta, and combinations thereof; L is O$^2$, OH, or H$_2$O; x is 0–10 and m is 10–20.

7. The composition of matter of claim 6, wherein x is 0 or 1, M' is V, L is O$^{2-}$, and m is 14 or 15.

8. The composition of matter of claim 6, wherein x is 0 and m is 14.

9. The composition of matter of claim 6, wherein x is 1, m' is V, L is O, and m is 15.

10. The composition of matter of claim 6, which is in the form of a water-soluble salt.

11. The composition of matter of claim 6, which is in the form of a water-insoluble salt.

12. The composition of matter of claim 6, which is in the form of a potassium ion salt.

13. The composition of matter of claim 6, wherein x is 0, A is P, and m is 14.

14. A composition of matter of formula (Ia):

$$[DA'_5M_{30-x}O_{110-x}(M'L)_x]^{m-} \qquad (I)$$

wherein D is Na$^+$ or Ca$^{+2}$; A' is P, As, Sb, Si, Ge, or combinations thereof; M is W$^6$, W$^{5+}$, or mixtures thereof; M' is a metallic element selected from the group consisting of Mo, V, Nb, Ta, and combinations thereof; L is O$^{2-}$, OH$^-$, or H$_2$O; ; x is 0–10; and m is 10–20, with the following provisos:
  (a) every occurrence of A' is not P when x is 0; and
  (b) every occurrence of A' is not P, M' is not V, and L is not O, when x is 1.

15. The composition of matter of claim 14, which is in the form of a water-soluble salt.

16. The composition of matter of claim 14, which is in the form of a sodium ion salt.

17. The method of claim 1, wherein said separating comprises extracting said anion of formula (II) into an organic solvent by means of a phase transfer agent.

18. The method of claim 1, wherein said separating comprises precipitating said anion of formula (II).

19. The method of claim 18, wherein said anion of formula (II) is precipitated as a potassium salt, a cesium salt, or a NR$_4^+$ salt, wherein R is methyl, ethyl, or n-propyl.

20. The method of claim 1, wherein said anion of formula (I) is selected from the group consisting of [NaP$_5$W$_{29}$VO$_{110}$]$^{16-}$ and [NaP$_5$W$_{30}$O$_{110}$]$^{14-}$.

21. The method of claim 3, wherein said anion of formula (I) is selected from the group consisting of [NaP$_5$W$_{29}$VO$_{110}$]$^{16-}$ and [NaP$_5$W$_{30}$O$_{110}$]$^{14-}$.

* * * * *

UNITED STATES PATENT AND TRADEMARK OFFICE
CERTIFICATE OF CORRECTION

PATENT NO. : 5,364,568            Page 1 of 4
DATED:     : November 15, 1994
INVENTOR(S) : MICHAEL T. POPE et al It is certified that errors appear in the above-identified patent and that said Letters patent is hereby corrected as shown below:

Column 4, line 43, "$[NP_5W_{30}O_{110}]^{14-}$" should read --$[NaP_5W_{30}O_{110}]^{14-}$--.

Column 6, line 3, "$NMePh_3^{30}$" should read --$NMePh_3^+$--.

Column 7, line 36, "$Nd_{3+}$" should read --$Nd^{3+}$--;

line 40, "$[In(PW_{11}O_{39})_2]^{11-}$" should read --$Ln(PW_{11}O_{39})_2]^{11-}$--;

line 50, "$P_5W_{30}W_{110}$" should read --$P_5W_{30}O_{110}$--;

line 62, "$U_{4+}$" should read --$U^{4+}$--.

Column 8, line 9, "$Ce^{2+}$ (r=1.09Å)" should read --$Cd^{2+}$ (r=1.09Å)--.

Column 9, line 43, "I=178" should read --I=1/2--;

line 54, "$[LN (PW_{11}O_{39})_2]^{11-}$" should read --$[Ln (PW_{11}O_{39})_2]^{11-}$--;

line 58, "$LIS_{OBS}$" should read --$LIS_{obs}$--.

Column 10, lines 6-10,

"
$$LIS_c = \frac{\left(\dfrac{A}{h}\right)^{(S_z)}}{\dfrac{\gamma B_o}{2\pi}}$$
"

UNITED STATES PATENT AND TRADEMARK OFFICE
CERTIFICATE OF CORRECTION

PATENT NO. : 5,364,568  
DATED: : November 15, 1994  
INVENTOR(S) : MICHAEL T. POPE et al Page 2 of 4

It is certified that errors appear in the above-identified patent and that said Letters patent is hereby corrected as shown below:

should read $$-- \quad LIS_c = \frac{\left(\dfrac{A}{h}\right)(S_z)}{\dfrac{\gamma B_o}{2\pi}} \quad --$$

line 13, "∠" should read --ϕ--;

line 39, "$c_j$" should read --$C_j$--;

line 46, "$c_j$" should read --$C_j$--;

line 55, "alculate" should read --calculate--.

Column 11, lines 4-5, "5W, It is another object of the present invention to $^2J_{P-O-W}$=3.8 Hz)" should read --5W, $^2J_{P-O-W}$=3.8 Hz--;

lines 12-13, "5W, $^2J_{P-O-W}$=1.32 Hz" should read --5W, $^2J_{P-O-W}$=1.32 Hz--;

line 15, "[LN(PW$_{11}$O$_{39}$)$_2$]" should read --[Ln(PW$_{11}$O$_{39}$)$_2$]--;

UNITED STATES PATENT AND TRADEMARK OFFICE
CERTIFICATE OF CORRECTION

PATENT NO. : 5,364,568   Page 3 of 4
DATED: : November 15, 1994
INVENTOR(S) : MICHAEL T. POPE et al It is certified that errors appear in the above-identified patent and that said Letters patent is hereby corrected as shown below:

line 24, "$Na^{30}$" should read --$Na^+$--;

line 26, "Al" should read --As--;

line 28, "plan" should read --plane--.

Column 12,    line 35, "om" should read --in--;

line 44, "$^{31}p$" should read --$^{31}P$--;

line 50, "$^{31}p$" should read --$^{31}P$--;

line 61, "likely to b" should read --likely to be--.

Column 13,    line 25, "$EU^{3+}$" should read --$Eu^{3+}$--;

line 40, "relaxativity" should read --relaxivity--;

line 44, "$[Gd(H_2O)_{2-3}[^{3+}$" should read --$[Gd(H_2O)_{2-3}]^{3+}$--;

UNITED STATES PATENT AND TRADEMARK OFFICE
CERTIFICATE OF CORRECTION

PATENT NO. : 5,364,568
DATED: : November 15, 1994    Page 4 of 4
INVENTOR(S) : MICHAEL T. POPE et al It is certified that error appears in the above-identified patent and that said Letters patent is hereby corrected as shown below:

line 50, "relaxtivity" should read --relaxivity--;

line 52, "Relaxativities" should read "Relaxivities--.

Column 15,    line 27, "ann ion" should read --an ion--.

Column 16,    line 47, "mest" should read --mesh--.

Signed and Sealed this

Thirteenth Day of October 1998

*Attest:*

BRUCE LEHMAN

*Attesting Officer*    *Commissioner of Patents and Trademarks*